United States Patent
Lim et al.

(10) Patent No.: US 7,519,368 B2
(45) Date of Patent: Apr. 14, 2009

(54) SYSTEM AND METHOD FOR PERFORMING NETWORK RE-ENTRY IN A COMMUNICATION SYSTEM

(75) Inventors: Hyoung-Kyu Lim, Seoul (KR); Chang-Hoi Koo, Seongnam-si (KR); Hong-Sung Chang, Suwon-si (KR); Jung-Je Son, Seongnam-si (KR); Sung-Jin Lee, Suwon-si (KR); Hyun-Jeong Kang, Seoul (KR); Yeong-Moon Son, Anyang-si (KR)

(73) Assignee: Samsung Electronics Co., Ltd (KR)

( * ) Notice: Subject to any disclaimer, the term of this patent is extended or adjusted under 35 U.S.C. 154(b) by 458 days.

(21) Appl. No.: 11/337,392

(22) Filed: Jan. 23, 2006

(65) Prior Publication Data

US 2006/0166672 A1    Jul. 27, 2006

(30) Foreign Application Priority Data

Jan. 22, 2005   (KR) ...................... 10-2005-0006117

(51) Int. Cl.
*H04Q 7/20* (2006.01)
*H04Q 7/22* (2006.01)
*H04Q 7/00* (2006.01)
*H04B 7/00* (2006.01)
*H04B 7/24* (2006.01)

(52) U.S. Cl. ...................... 455/436; 455/437; 455/525; 370/331

(58) Field of Classification Search .................. 455/436
See application file for complete search history.

(56) References Cited

U.S. PATENT DOCUMENTS

| | | | |
|---|---|---|---|
| 2004/0174845 A1* | 9/2004 | Koo et al. | 370/328 |
| 2004/0185853 A1* | 9/2004 | Kim et al. | 455/438 |
| 2005/0197126 A1 | 9/2005 | Kang et al. | |
| 2005/0208945 A1 | 9/2005 | Hong et al. | |
| 2005/0265360 A1* | 12/2005 | Kim et al. | 370/338 |
| 2005/0272481 A1* | 12/2005 | Kim | 455/574 |
| 2006/0083201 A1* | 4/2006 | He et al. | 370/331 |
| 2006/0111111 A1* | 5/2006 | Ovadia | 455/436 |

OTHER PUBLICATIONS

IEEE: Part 16: Air Interface for Fixed and Mobile Broadband Wireless Access Systems—Amendment for Physical and Medium Access Control Layers for Combined Fixed and Mobile Operation in Licensed Bands, Dec. 23, 2004.
Hyoung-Kyu Lim et al., Clarification of HO Process Optimization Field and its Usage, IEEE 802.16 Broadband Wireless Access Working Group, Jan. 25, 2005.

* cited by examiner

*Primary Examiner*—Nick Corsaro
*Assistant Examiner*—Tangela T. Chambers
(74) *Attorney, Agent, or Firm*—The Farrell Law Firm, PC

(57) ABSTRACT

In a communication system, a mobile station (MS) sends a target base station (BS) a notification indicating that it is to perform a handover from a serving BS to the target BS. The target BS transmits to the MS handover process optimization information indicating a possibility of omitting at least one process required by the MS to perform a network re-entry operation with the target BS according to the handover notification from the MS. The MS receives the handover process optimization information and performs a network re-entry operation with the target BS according to the handover process optimization information.

10 Claims, 10 Drawing Sheets

SYSTEM AND METHOD FOR PERFORMING NETWORK RE-ENTRY IN A COMMUNICATION SYSTEM

PRIORITY

This application claims the benefit under 35 U.S.C. § 119(a) of an application filed in the Korean Intellectual Property Office on Jan. 22, 2005 and assigned Serial No. 2005-6117, the entire contents of which are hereby incorporated by reference.

BACKGROUND OF THE INVENTION

1. Field of the Invention

The present invention relates generally to a communication system, and in particular, to a system and method for performing network re-entry due to a handover of a mobile station (MS).

2. Description of the Related Art

Extensive research is being conducted on the next generation communication system to provide users with services that guarantee various Qualities-of-Service (QoSs) at a high data rate.

A wireless Local Area Network (LAN) communication system and a wireless Metropolitan Area Network (MAN) communication system support a high data rate. Compared with the wireless LAN communication system, the wireless MAN communication system, which is a Broadband Wireless Access (BWA) communication system, has broader coverage and supports a higher data rate. Therefore, much of the research on the next generation communication system is being carried out to develop a new communication system that guarantees a mobility and QoS of a subscriber station (SS) for the wireless LAN communication system and the wireless MAN communication system supporting a higher data rate, in order to provide a high-speed service desired by developers of the next generation communication system.

A system employing an Orthogonal Frequency Division Multiplexing (OFDM) scheme and/or an Orthogonal Frequency Division Multiple Access (OFDMA) scheme to support a broadband transmission network for physical channels of the wireless MAN communication system is commonly referred to as an Institute of Electrical and Electronics Engineers (IEEE) 802.16a communication system and an IEEE 802.16e communication system, which is based on the IEEE 802.16a and the IEEE 802.16e standards.

FIG. 1 is a diagram illustrating a configuration of a conventional IEEE 802.16e communication system.

Referring to FIG. 1, the IEEE 802.16e communication system has a multicell configuration, i.e., includes a cell 100 and a cell 150. The IEEE 802.16e communication system includes a base station (BS) 110 for managing the cell 100, a BS 140 for managing the cell 150, and a plurality of MSs 111, 113, 130, 151 and 153. Signal exchange between the BSs 110 and 140 and the MSs 111, 113, 130, 151 and 153 is achieved using the OFDM/OFDMA scheme. Among the MSs 111, 113, 130, 151 and 153, the MS 130 is located in a boundary between the cell 100 and the cell 150, i.e., a handover region. The MS 130 switches its serving BS from the BS 110 to the BS 140 if it moves toward the cell 150 managed by the BS 140 while exchanging signals with the BS 110.

FIG. 2 is a signaling diagram illustrating a network re-entry process with a target BS by an MS due to handover in the conventional IEEE 802.16e communication system.

Referring to FIG. 2, an MS 200, after performing handover from a serving BS to a target BS 250, acquires downlink (DL) synchronization with the target BS 250 and receives in step 211 parameters to be used in a downlink and an uplink (UL). Thereafter, the MS 200 must acquire uplink synchronization and adjust transmission power by performing a ranging operation with the target BS 250. Therefore, the MS 200 transmits in step 213 a Ranging Request (RNG-REQ) message to the target BS 250, and the target BS 250 transmits in step 215 a Ranging Response (RNG-RSP) message to the MS 200 in response to the RNG-REQ message.

After the ranging operation, the MS 200 transmits in step 217 a Subscriber Station Basic Capability Request (SBC-REQ) message to the target BS 250 to negotiate on a basic capability of the MS 200 with the target BS 250. The SBC-REQ message, a Medium Access Control (MAC) message, includes information on a modulation and coding scheme (MCS) supportable by the MS 200. Upon receiving the SBC-REQ message from the MS 200, the target BS 250 transmits in step 219 a Subscriber Station Basic Capability Response (SBC-RSP) message to the MS 200 in response to the SBC-REQ message after checking the MCS that is supportable by the MS 200, included in the received SBC-REQ message.

Upon receiving the SBC-RSP message, the MS 200 transmits in step 221 a Privacy Key Management Request (PKM-REQ) message to the target BS 250 for MS authentication and key exchange. The PKM-REQ message, a MAC message for MS authentication, includes a unique certificate of the MS 200. Upon receiving the PKM-REQ message, the target BS 250 performs authentication on the MS 200 with an Authentication Server (AS, not shown) using the unique certificate of the MS 200, included in the PKM-REQ message. If the MS 200 is an authenticated MS as a result of the authentication, the target BS 250 transmits in step 223 a Privacy Key Management Response (PKM-RSP) message to the MS 200 in response to the PKM-REQ message. The PKM-RSP message includes an authentication key (AK) and a traffic encryption key (TEK) allocated to the MS 200.

Upon receiving the PKM-RSP message, the MS 200 transmits in step 225 a Registration Request (REG-REQ) message to the target BS 250. The REG-REQ message includes MS registration information for the MS 200. Upon receiving the REG-REQ message, the target BS 250 detects MS registration information included in the REG-REQ message, registers the MS 200 therein according to the detection result, and transmits in step 227 a Registration Response (REG-RSP) message to the MS 200 in response to the REG-REQ message. The REG-RSP message includes MS registration information for the registered MS.

After being registered in the target BS 250, the MS 200 can optionally establish in step 229 an Internet Protocol (IP) connection to the target BS 250 depending on a type of the MS 200 or whether information on the MS 200 is shared and exchanged between BSs, or perform in step 231 an operation of transmitting operation parameters to the target BS 250. The operation of establishing an IP connection to the target BS 250 or transmitting operation parameters can be optionally transmitted. Thereafter, the MS 200 re-establishes a connection in step 233 by re-establishing a flow previously being serviced in the serving BS, and in step 235 normally performs a communication service with the target BS 250 through the re-established connection.

FIG. 3 is a signaling diagram illustrating a process of exchanging SBC-REQ message, SBC-RSP message, REG-REQ message and REG-RSP message during a network re-entry process with a target BS by an MS due to handover in a conventional IEEE 802.16e communication system.

Referring to FIG. 3, an MS 300, after performing handover from a serving BS to a target BS 350, transmits in step 311 an RNG-REQ message to the target BS 350 in order to perform a ranging operation with the target BS 350. Then the target BS 350 transmits in step 313 an RNG-RSP message to the MS 300 in response to the RNG-REQ message. Upon receiving the RNG-RSP message, the MS 300 transmits in step 315 an SBC-REQ message to the target BS 350 within a predetermined time. At the time of transmitting the SBC-REQ message to the target BS 350, the MS 300 starts a T18 timer used for waiting for receipt of an SBC-RSP message in response to the SBC-REQ message, waits for receipt of the SBC-RSP message until the T18 timer expires, and retransmits the SBC-REQ message to the target BS 350 if the T18 expires.

However, if the MS 300 receives in step 317 the SBC-RSP message from the target BS 350 before the T18 timer expires, the MS 300 transmits in step 319 an REG-REQ message to the target BS 350 for its registration in the target BS 350. Although an operation of exchanging PKM-REQ/PKM-RSP messages should be performed between the MS 300 and the target BS 350 after the operation of exchanging the SBC-REQ/SBC-RSP messages as described with reference to FIG. 2, the operation of exchanging PKM-REQ/PKM-RSP messages is omitted in FIG. 3 for convenience. At the time of transmitting the REG-REQ message to the target BS 350, the MS 300 starts a T6 timer used for waiting for receipt of an REG-RSP message in response to the REG-REQ message, waits for receipt of the REG-RSP message until the T6 timer expires, and retransmits the REG-REQ message to the target BS 350 if the T6 expires. If the MS 300 receives in step 321 the REG-RSP message from the target BS 350 before the T6 timer expires, it performs the next operation for the network re-entry.

When an MS performs handover from a serving BS to a target BS, it is possible to minimize a service delay due to the handover by minimizing a handover process between the serving BS and the target BS through a backbone network. To this end, the serving BS or the target BS provides the MS with information indicating omittable processes among the processes necessary for the MS and handover of the MS, using a 1-byte Hanover (HO) Process Optimization field. A format of the HO Process Optimization field will now be described with reference to Table 1.

TABLE 1

| Bit # | Description |
|---|---|
| 0 | Omit SBC-REQ/RSP management message during re-entry processing |
| 1 | Omit PKM-REQ/RSP management messages during re-entry processing |
| 2 | Omit REG-REQ/RSP management message during re-entry processing |
| 3 | Omit Network Address Acquisition management messages during re-entry processing |
| 4 | Omit Time of Day Acquisition management messages during re-entry processing |
| 5 | Omit TFTP management message during re-entry processing |
| 6 | Full service and operational state transfer or sharing between serving BS and target BS (ARQ, timers, counters, MAC state machines, etc.) |
| 7 | Reserved (if the field is included in NBR-ADV message or MOB-BSHO-RSP message), or Post-HO re-entry MS DL data pending at target BS (if the field is included in RNG-RSP as Type, Length, Value (TLV) |

As shown in Table 1, the HO Process Optimization field includes 8 bits, and is used to indicate if the MS should perform various processes while it is performing a network re-entry operation. Each of the 8 bits indicates whether the MS can omit each of the necessary processes while it is performing the network re-entry operation with a target BS after performing handover from a serving BS to the target BS. A description will now be made of information indicated by each of the bits.

First, bit#0 indicates whether to omit transmission/reception of SBC-REQ/SBC-RSP messages between a target BS and an MS. bit#0='0' indicates that transmission/reception of the SBC-REQ/SBC-RSP messages will be performed between the target BS and the MS, and bit#0='1' indicates that transmission/reception of the SBC-REQ/SBC-RSP messages will not be performed between the target BS and the MS.

Second, bit#1 indicates whether to omit transmission/reception of PKM-REQ/PKM-RSP messages between a target BS and an MS. bit#1='0' indicates that transmission/reception of the PKM-REQ/PKM-RSP messages will be performed between the target BS and the MS, and bit#1='1' indicates that transmission/reception of the PKM-REQ/PKM-RSP messages will not be performed between the target BS and the MS.

Third, bit#2 indicates whether to omit transmission/reception of REG-REQ/REG-RSP messages between a target BS and an MS. bit#2='0' indicates that transmission/reception of the REG-REQ/REG-RSP messages will be performed between the target BS and the MS, and bit#2='1' indicates that transmission/reception of the REG-REQ/REG-RSP messages will not be performed between the target BS and the MS.

Fourth, bit#3 indicates whether to omit transmission/reception of Network Address Acquisition management messages between a target BS and an MS. bit#3='0' indicates that transmission/reception of the Network Address Acquisition management messages will be performed between the target BS and the MS, and bit#3='1' indicates that transmission/reception of the Network Address Acquisition management messages will not be performed between the target BS and the MS. The Network Address Acquisition management messages refer to the messages required by the MS to acquire a network address from the target BS.

Fifth, bit#4 indicates whether to omit transmission/reception of Time Of Day Acquisition management messages between a target BS and an MS. bit#4='0' indicates that transmission/reception of the Time Of Day Acquisition management messages will be performed between the target BS and the MS, and bit#4='1' indicates that transmission/reception of the Time Of Day Acquisition management messages will not be performed between the target BS and the MS. The Time Of Day Acquisition management messages refer to the messages required by the MS to newly acquire time information from the target BS.

Sixth, bit#5 indicates whether to omit transmission/reception of Trivial File Transfer Protocol (TFTP) management messages between a target BS and an MS. bit#5='0' indicates that transmission/reception of the TFTP management messages will be performed between the target BS and the MS, and bit#5='1' indicates that transmission/reception of the TFTP management messages will not be performed between the target BS and the MS. Whether to apply the processes related to bit#3, bit#4 and bit#5 to the MS is determined depending on a type of the MS. However, it will be assumed herein that the processes are applied to all MSs regardless of types of the MSs.

Seventh, bit#6 indicates whether an MS can directly perform a normal service in a target BS without any additional process between the MS and the target BS because a serving BS transmits information on the service previously provided to the MS in the serving BS and its operation state information to the target BS or the BSs share the information. bit#6='1' indicates that the MS can directly perform a normal service in the target BS without any additional process between the target BS and the MS. The service and operation state information can include, for example, Automatic Retransmission reQuest (ARQ) state, various timer values, counter values, MAC state machine values, etc.

Finally, bit#7 is reserved (not used) when the HO Process Optimization field is included in a Neighbor Advertisement (NBR-ADV) message and a MOBile Base Station HandOver Response (MOB-BSHO-RSP) message. When the HO Process Optimization field is included in an RNG-RSP message, bit#7 indicates whether a target BS is buffering the downlink data to be transmitted to an MS after the MS performs handover. bit#7='1' indicates that the target BS is buffering the downlink data to be transmitted to the MS after the MS performs the handover.

The HO Process Optimization field, when it is included in the NBR-ADV message and the MOB-BSHO-RSP message as described above, is provided from a serving BS to an MS as a part of information on possible target BSs neighboring the serving BS. When the MS performs handover to a target BS, the meanings indicated by the bits of the HO Process Optimization field may be changed by the target BS. When the HO Process Optimization field is included in the RNG-RSP message, it serves to correctly indicate which process the MS should omit or should not omit during a network re-entry operation to the target BS.

The IEEE 802.16e communication system performs a network re-entry operation with a target BS due to handover of an MS using the HO Process Optimization field information shown in Table 1 as described above, and supports an operation of transmitting one or both of an SBC-RSP message and an REG-RSP message to the MS if needed, regardless of values of bit#0 and bit#2 of the HO Process Optimization field.

However, while the MS is performing network re-entry using the HO Process Optimization field information, if the target BS transmits one or both of an SBC-RSP message and an REG-RSP message to the MS if needed, regardless of set values of bit#0 and bit#2 of the HO Process Optimization field information, the following problems may occur.

First, because the target BS can transmit one or both of an SBC-RSP message and an REG-RSP message to the MS regardless of set values for respective bits of the HO Process Optimization field information included in an RNG-RSP message, even though it is assumed that corresponding bits, i.e., bit#0 and bit#1, of the HO Process Optimization field are set to '1', the MS must wait for receipt of the SBC-RSP message and the REG-RSP message for a predetermined time without performing the next processes for the network re-entry, awaiting the target BS to transmit the SBC-RSP message and the REG-RSP message. In this case, because the MS cannot determine the time for which it must wait for receipt of the SBC-RSP message and the REG-RSP message, it is not possible to satisfy the purpose of the HO Process Optimization field proposed for fast network re-entry with the target BS due to handover of the MS. In addition, the network re-entry operation of the MS has not been clearly specified, causing confusion.

Second, in the state where an MS recognizes that it should not necessarily receive one or both of an SBC-RSP message and an REG-RSP message as one or both of bit#0 and bit#1 of an HO Process Optimization field included in an RNG-RSP message transmitted by a target BS are set to '1' in their values, the MS may occasionally fail to receive one or both of the SBC-RSP message and the REG-RSP message for a possible reason that there is an error in one or both of the SBC-RSP message and the REG-RSP message due to a bad channel state even though the target BS has transmitted one or both of the SBC-RSP message and the REG-RSP message. In this case, the target BS determines that it has successfully transmitted one or both of the SBC-RSP message and the REG-RSP message to the MS, and the MS waits for a predetermined time without performing the next processes for the network re-entry, waiting for the target BS to transmit one or both of the SBC-RSP message and the REG-RSP message, and after a lapse of the predetermined time, performs the next processes for the network re-entry, determining that the target BS has not transmitted one or both of the SBC-RSP message and the REG-RSP message. In this case, the MS fails to receive the values that should be set to different values from the values previously used in a serving BS, from the target BS through one or both of the SBC-RSP message and the REG-RSP message. Therefore, the target BS and the MS are inconsistent in terms of set values of their operation parameters, causing an error in the next processes for the network re-entry. In the worst case, there is a need to initialize a connection between the target BS and the MS. The reason for this problem is because as described for the first problem, the MS cannot determine if the target BS has transmitted one or both of the SBC-RSP message and the REG-RSP message, and even though the MS can determine that the target BS has transmitted one or both of the SBC-RSP message and the REG-RSP message, the MS has no way to determine if the corresponding message(s) was normally received and to report the determination result to the target BS.

SUMMARY OF THE INVENTION

It is, therefore, an object of the present invention to provide a system and method for performing network re-entry due to handover of an MS in a communication system.

It is another object of the present invention to provide a system and method for performing network re-entry with a minimum delay in a communication system.

It is further another object of the present invention to provide a system and method for performing network re-entry with a minimum delay using HO Process Optimization field information in a communication system.

According to one aspect of the present invention, there is provided a system and method for performing a network re-entry operation in a communication system. A mobile station (MS) sends a target base station (BS) a notification indicating that it needs to performs a handover from a serving BS to the target BS. The target BS transmits, to the MS, handover process optimization information indicating the possibility of omitting at least a selected one of the processes required by the MS to perform a network re-entry operation with the target BS according to the handover notification from the MS. The MS receives the handover process optimization information and performs a network re-entry operation with the target BS according to the handover process optimization information.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF EXEMPLARY EMBODIMENTS

Figure 1:
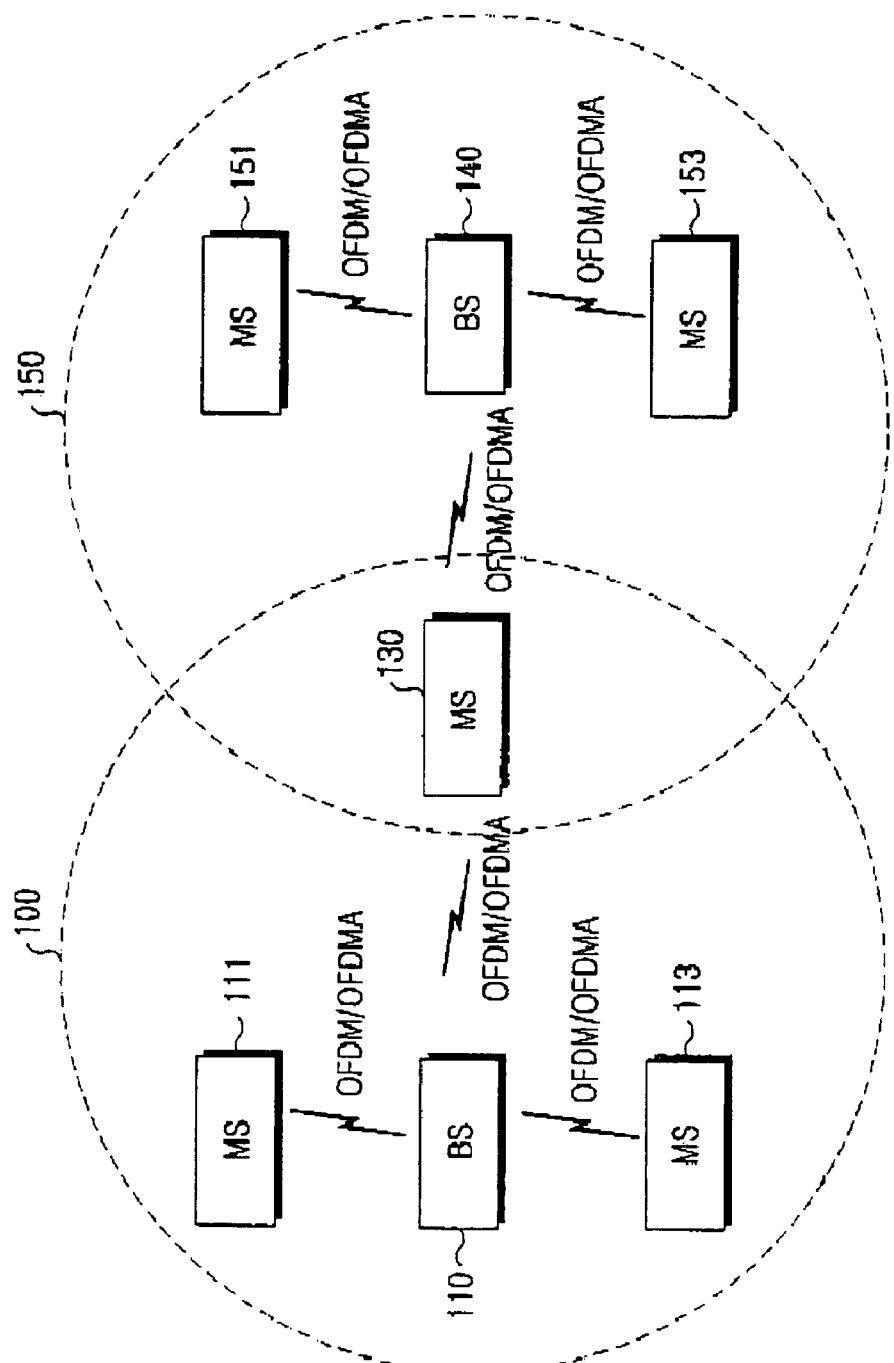
FIG. 1 is a diagram illustrating a configuration of a conventional IEEE 802.16e communication system.
Figure 2:
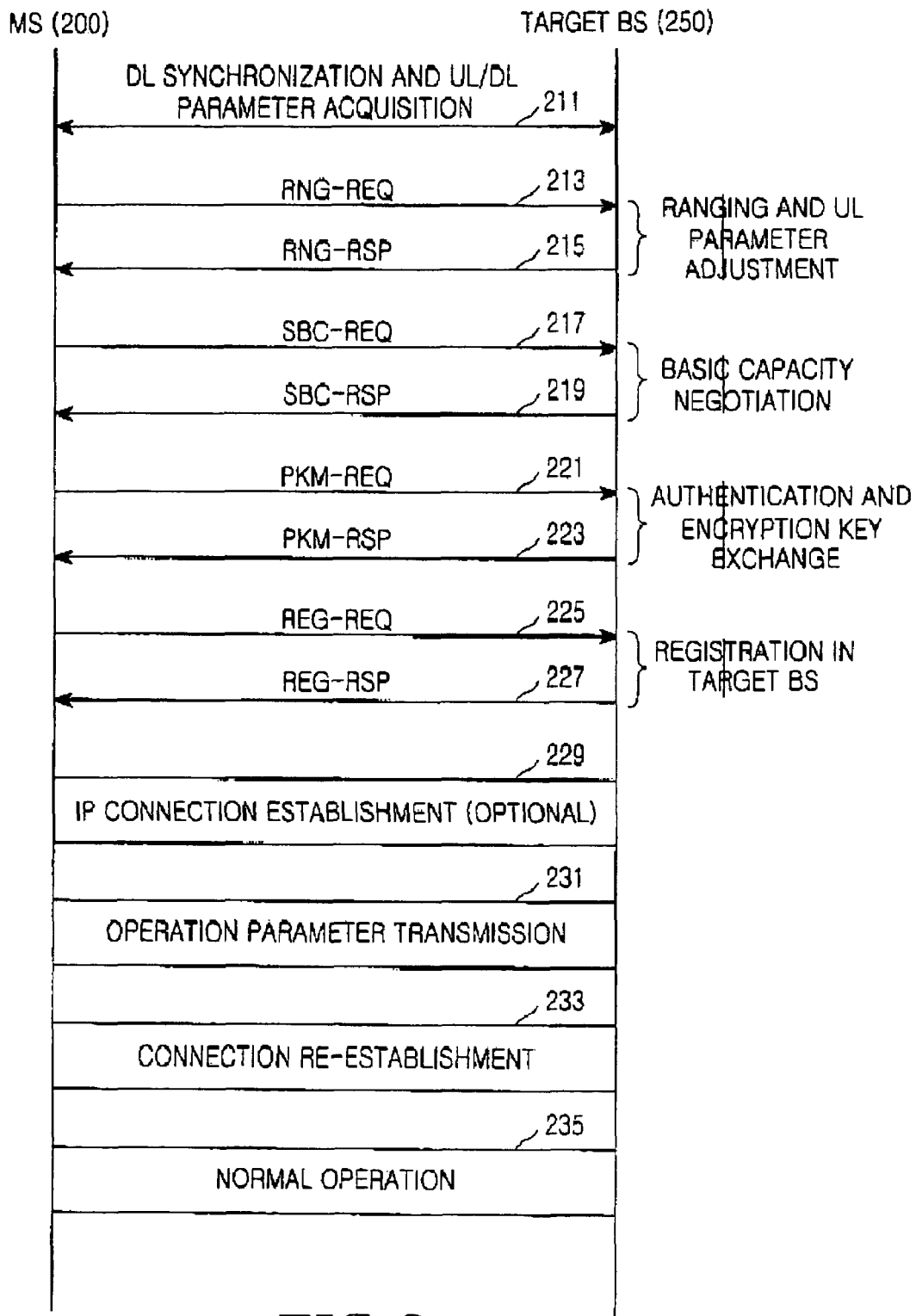
FIG. 2 is a signaling diagram illustrating a network re-entry process with a target BS by an MS due to handover in the conventional IEEE 802.16e communication system.
Figure 3:
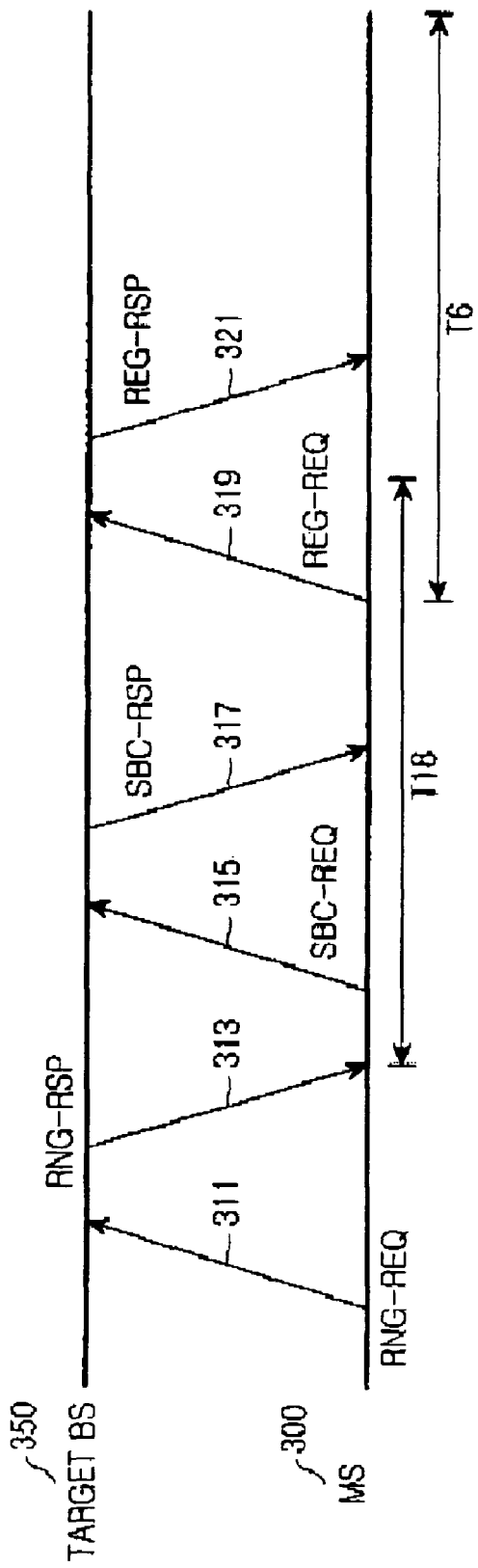
FIG. 3 is a signaling diagram illustrating a process of exchanging SBC-REQ message, SBC-RSP message, REG-REQ message and REG-RSP message during a network re-entry process with a target BS by an MS due to handover in a conventional IEEE 802.16e communication system.

Exemplary embodiments of the present invention will now be described in detail with reference to the annexed drawings. In the following description, a detailed description of known functions and configurations incorporated herein has been omitted for clarity and conciseness.

The present invention proposes a system and method for performing a network re-entry in a communication system. Further, the present invention proposes a system and method for performing a network re-entry operation when a mobile station (MS) performs a handover during communication in a communication system. In addition, the present invention proposes a system and method for allowing an MS to reliably perform a network re-entry within the shortest time by proposing a scheme for allowing the MS to perform a network re-entry operation using Hanover (HO) Process Optimization field information when it performs a handover in a communication system. In the following description, an Institute of Electrical and Electronics Engineers (IEEE) 802.16e communication system, which is a typical Broadband Wireless Access (BWA) communication system, will be used as the communication system, by way of example.

With reference to Table 2, a description will now be made of a format of an HO Process Operation field used during a network re-entry operation according to the present invention. The HO Process Optimization field indicates if the MS should perform various necessary processes while it is performing a network re-entry operation, and determining if to perform the respective processes is made depending on bit values defined in Table 2.

TABLE 2

| bit # | Description |
| --- | --- |
| 0 | Omit SBC-RSP management message during re-entry processing |
| 1 | Omit PKM-REQ/RSP management messages during re-entry processing |
| 2 | Omit REG-RSP management message during re-entry processing |
| 3 | Omit Network Address Acquisition management messages during re-entry processing |
| 4 | Omit Time of Day Acquisition management messages during re-entry processing |
| 5 | Omit TFTP management message during re-entry processing |
| 6 | Full service and operational state transfer or sharing between serving BS and target BS (ARQ, timers, counters, MAC state machines, etc.) |
| 7 | Omit all SBC-REQ and REG-REQ management messages during re-entry processing. If this bit is '0', MS shall send the REQ message(s) as indicated not to omit the corresponding RSP message(s) in bit #0 and #2. |

As shown in Table 2, the HO Process Optimization field includes 8 bits, and each of the 8 bits indicates if the MS can omit each of the necessary processes while it is performing a network re-entry operation with a target BS after performing handover from a serving BS to the target BS. A description will now be made of information indicated by each of the bits.

First, bit#0 indicates if a target BS will omit transmission of a Subscriber Station Basic Capability Response (SBC-RSP) message to an MS. bit#0='0' indicates that the target BS will transmit the SBC-RSP message to the MS, and bit#0='1' indicates that the target BS will not transmit the SBC-RSP messages to the MS.

Second, bit#1 indicates whether to omit transmission/reception of Privacy Key Management Request (PKM-REQ)/ Privacy Key Management Response (PKM-RSP) messages between a target BS and an MS. bit#1='0' indicates that transmission/reception of the PKM-REQ/PKM-RSP messages will be performed between the target BS and the MS, and bit#1='1' indicates that transmission/reception of the PKM-REQ/PKM-RSP messages will not be performed between the target BS and the MS.

Third, bit#2 indicates if a target BS will omit transmission of a Registration Response (REG-RSP) message to an MS. bit#2='0' indicates that the target BS will transmit the REG-RSP message to the MS, and bit#2='1' indicates that the target BS will not transmit the REG-RSP message to the MS.

Fourth, bit#3 indicates whether to omit transmission/reception of Network Address Acquisition management messages between a target BS and an MS. bit#3='0' indicates that transmission/reception of the Network Address Acquisition management messages will be performed between the target BS and the MS, and bit#3='1' indicates that transmission/reception of the Network Address Acquisition management messages will not be performed between the target BS and the MS. The Network Address Acquisition management messages refer to the messages required by the MS to acquire a network address from the target BS.

Fifth, bit#4 indicates whether to omit transmission/reception of Time Of Day Acquisition management messages between a target BS and an MS. bit#4='0' indicates that transmission/reception of the Time Of Day Acquisition management messages will be performed between the target BS and the MS, and bit#4='1' indicates that transmission/reception of the Time Of Day Acquisition management messages will not be performed between the target BS and the MS. The Time Of Day Acquisition management messages refer to the messages required by the MS to newly acquire time information from the target BS.

Sixth, bit#5 indicates whether to omit transmission/reception of Trivial File Transfer Protocol (TFTP) management messages between a target BS and an MS. bit#5='0' indicates that transmission/reception of the TFTP management messages will be performed between the target BS and the MS, and bit#5='1' indicates that transmission/reception of the TFTP management messages will not be performed between the target BS and the MS. Whether to apply the processes related to bit#3, bit#4 and bit#5 to the MS is determined depending on a type of the MS. However, it will be assumed herein that the processes are applied to all MSs regardless of types of the MSs.

Seventh, bit#6 indicates if an MS can directly perform a normal service in a target BS without any additional process between the MS and the target BS because a serving BS transmits information on the service previously provided to the MS in the serving BS and its operation state information to the target BS or the BSs share the information. bit#6='1' indicates that the MS can directly perform a normal service in the target BS without any additional process between the target BS and the MS. The service and operation state information can include, for example, Automatic Retransmission reQuest (ARQ) state, various timer values, counter values, MAC state machine values, etc.

Finally, bit#7 indicates if an MS will omit transmission of a Subscriber Station Basic Capability Request (BSC-REQ) and a Registration Request (REG-REQ) message to a target BS. bit#7='1' indicates that the MS will not transmit the SBC-REQ message and the REG-REQ message to the target BS. In this case, combinations of bit#0 and bit#2 give the following 4 possible cases.

In a first case where the HO Process Optimization field is set to '0X0XXXX1' in which bit#0='0' and bit#2='0' (where 'X' denotes a "don't care" bit, and the "don't care" bits will not be taken into consideration in the present invention), the MS does not transmit the SBC-REQ message and the REG-REQ message to the target BS, and the target BS must sequentially transmit both the SBC-RSP message and the REG-RSP message to the MS. Operations of the target BS and the MS for the HO Process Optimization field='0X0XXXX1' will be described in detail later with reference to FIG. 4.

In a second case where the HO Process Optimization field is set to '0X1XXXX1' in which bit#0='0' and bit#2='1', the MS does not transmit the SBC-REQ message and the REG-REQ message to the target BS, and the target BS must transmit the SBC-RSP message to the MS and does not transmit the REG-RSP message to the MS. Operations of the target BS and the MS for the HO Process Optimization field='0X1XXXX1' will be described in detail later with reference to FIG. 5.

In a third case where the HO Process Optimization field is set to '1X0XXXX1' in which bit#0='1' and bit#2='0', the target BS does not transmit the SBC-RSP message to the MS and transmits the REG-RSP message to the MS. Operations of the target BS and the MS for the HO Process Optimization field='1X0XXXX1' will be described in detail later with reference to FIG. 5.

In a fourth case where the HO Process Optimization field is set to '1X1XXXX1' in which bit#0='1' and bit#2='1', the MS does not transmit the SBC-REQ message and the REG-REQ message to the target BS, and the target BS does not transmit the SBC-RSP message and the REG-RSP message to the MS. The fourth case indicates that both of transmission/reception of the SBC-REQ/SBC-RSP messages and transmission/reception of the REG-REQ/REG-RSP messages are not performed between the target BS and the MS, and the MS can directly perform network re-entry to the target BS.

In contrast to the above, bit#7=0 indicates that the MS will transmit the SBC-REQ message and the REG-REQ message to the target BS. Also, in this case, combinations of bit#0 and bit#2 give the following 4 possible cases.

In a first case where the HO Process Optimization field is set to '0X0XXXX0' in which bit#0='0' and bit#2='0', the MS transmits both of the SBC-REQ message and the REG-REQ message to the target BS. Then the target BS must transmit the SBC-RSP message and the REG-RSP message to the MS in response to the SBC-REQ message and the REG-REQ message. In this case, the HO Process Optimization field never affects transmission/reception of the SBC-REQ/SBC-RSP messages and the REG-REQ/REG-RSP messages.

In a second case where the HO Process Optimization field is set to '0X1XXXX0' in which bit#0='0' and bit#2='1', the MS transmits the SBC-REQ message to the target BS, performing transmission/reception of the SBC-REQ/SBC-RSP messages between the MS and the target BS, and the MS does not transmit the REG-REQ message to the target BS. Operations of the target BS and the MS for the HO Process Optimization field='0X1XXXX0' will be described in detail later with reference to FIG. 6.

In a third case where the HO Process Optimization field is set to '1X0XXXX0' in which bit#0='1' and bit#2='0', the MS does not transmit the SBC-REQ message to the target BS and transmits the REG-REQ message to the target BS, performing transmission/reception of the REG-REQ/REG-RSP messages between the MS and the target BS. Operations of the target BS and the MS for the HO Process Optimization field='1X0XXXX0' will be described in detail later with reference to FIG. 6.

A fourth case where the HO Process Optimization field is set to '1X1XXXX0' in which bit#0='1' and bit#2='1', indicates an abnormal situation that cannot occur in the IEEE 802.16e communication system. That is, even though the target BS transmits both the SBC-RSP message and the REG-RSP message to the MS, the MS transmits at least one of the SBC-REQ message and the REG-REQ message to the target BS, performing an indefinite operation. Therefore, the fourth case should not happen. However, if the fourth case where the HO Process Optimization field is set to '1X1XXXX0' happens, it is preferable to perform a general network re-entry operation, i.e., an operation for the HO Process Optimization field='0X0XXXX0', for a definite operation of the MS.

As described above, the use of the new HO Process Optimization field proposed in an embodiment of the present invention can solve the first problem occurring due to the use of the existing HO Process Optimization field for the conventional IEEE 802.16e communication system, i.e., can prevent a possible indefinite operation between a target BS and an MS, occurring when the target BS transmits one or both of an SBC-RSP message and an REG-RSP message to the MS if needed, regardless of set values of bit#0 and bit#2 of the HO Process Optimization field information. However, the use of the new HO Process Optimization field cannot solve the second problem occurring due to the use of the existing HO Process Optimization field for the conventional IEEE 802.16e communication system, i.e., cannot solve the problem that the MS fails to receive the SBC-RSP message and the REG-RSP message transmitted by the target BS due to a bad channel state. Nevertheless, the use of the new HO Process Optimization field proposed in the present invention allows the MS to correctly determine which message the target BS will transmit, decreasing the probability of the problem, compared with the use of the existing HO Process Optimization field for the conventional IEEE 802.16e communication system. In order to clearly specify the operations of the target BS and the MS in the network re-entry process, it is necessary to allow the MS to determine that it has failed to receive from the target BS a notification message indicating scheduled message transmission, and allow the MS to transmit to the target BS a report message indicating that it has failed to receive the notification message transmitted by the target BS.

Therefore, an embodiment of the present invention allows the MS to use a preset timer in order to determine that it has failed to receive from the target BS a notification message indicating scheduled message transmission. That is, the present invention proposes a scheme for allowing the MS to wait for receipt of a corresponding message from the target BS until the timer expires, and after expiration of the timer, transmit to the target BS a REQ message indicating its failure to receive the corresponding message. The timer used herein may include a T18 timer and a T6 timer provided in the conventional IEEE 802.16e communication system. Alternatively, the timer may include a newly defined timer. A description will now be made of the T18 timer and the T6 timer.

It is provided that the T18 timer, as described above, starts at the time that the MS transmits an SBC-REQ message to the target BS, in order to allow the MS to wait for receipt of an SBC-RSP message from the target BS in response to the SBC-REQ message, and the MS retransmits the SBC-REQ message to the target BS when the T18 timer expires. In an embodiment of the present invention, the MS uses the T18 timer when it receives a Ranging Response (RNG-RSP) message with an HO Process Optimization field='0X1XXXX1' indicating that the MS will not transmit an SBC-REQ message and an REG-REQ message to the target BS, the target BS will not transmit an REG-RSP message to the MS, and the target BS will transmit only the SBC-RSP message to the MS. Herein, an operation of transmitting/receiving a Raging Request (RNG-REQ) message and an RNG-RSP message, performed as the MS performs handover from a serving BS to a target BS, is equal to the general operation of transmitting/ receiving the RNG-REQ message and the RNG-RSP message, except for the HO Process Optimization field included in the RNG-RSP message. When the T18 timer expires, the MS transmits the SBC-REQ message to the target BS to request transmission of an SBC-RSP message, determining that it has failed to receive the SBC-RSP message transmitted by the target BS. If the MS transmits the SBC-REQ message to the target BS, the MS and the target BS operate according to the existing SBC-REQ/SBC-RSP message transmission/ reception operation. An operation between the target BS and the MS based on the T18 timer will be described in detail later with reference to FIG. 7.

It is provided that the T6 timer, as described above, starts at the time that the MS transmits an REG-REQ message to the target BS, in order to allow the MS to wait for receipt of an REG-RSP message from the target BS in response to the REG-REQ message, and the MS retransmits the REG-REQ message to the target BS when the T6 timer expires. In an embodiment of the present invention, the MS uses the T6 timer when it receives an RNG-RSP message with an HO Process Optimization field='1X0XXXX1' indicating that the MS will not transmit an SBC-REQ message and an REG-REQ message to the target BS, the target BS will not transmit an SBC-RSP message to the MS, and the target BS will transmit only the REG-RSP message to the MS. When the T6 timer expires, the MS transmits the REG-REQ message to the target BS to request transmission of an REG-RSP message, determining that it has failed to receive the REG-RSP message transmitted by the target BS. If the MS transmits the REG-REQ message to the target BS, the MS and the target BS operate according to the existing REG-REQ/REG-RSP message transmission/reception operation. An operation between the target BS and the MS based on the T6 timer will be described in detail later with reference to FIG. 7.

If the MS receives an RNG-RSP message with an HO Process Optimization field='0X0XXXX1' indicating that the MS will not transmit an SBC-REQ message and an REG-REQ message to the target BS, and the target BS will transmit an REG-RSP message and an SBC-RSP message to the MS, the MS starts a timer using a maximum value, Max {T18,T6}, between timer values of the T18 timer and the T6 timer. An operation performed when the MS fails to receive both of the SBC-RSP message and the REG-RSP message from the target BS until the Max{T18,T6} timer expires is different from an operation performed when the MS fails to receive only one of the SBC-RSP message and the REG-RSP message from the target BS until the Max {T18,T6} timer expires. The operations will be described in detail later with reference to FIG. 8 through FIG. 10.

With reference to FIG. 4 through FIG. 10, a detailed description will now be made of RNG-REQ/RNG-RSP message transmission/reception, SBC-REQ/SBC-RSP message transmission/reception, and REG-REQ/REG-RSP message transmission/reception operations between an MS and a target BS during a network re-entry operation of the MS according to the present invention. Although a Privacy Key Management Request (PKM-REQ)/Privacy Key Management Response (PKM-RSP) message transmission/reception operation is also required in the network re-entry process in addition to the RNG-REQ/RNG-RSP message transmission/ reception, SBC-REQ/SBC-RSP message transmission/reception, and REG-REQ/REG-RSP message transmission/reception operations as described above, the present invention will be described only for the RNG-REQ/RNG-RSP message transmission/reception, SBC-REQ/SBC-RSP message transmission/reception, and REG-REQ/REG-RSP message transmission/reception operations, for convenience.

Figure 4:
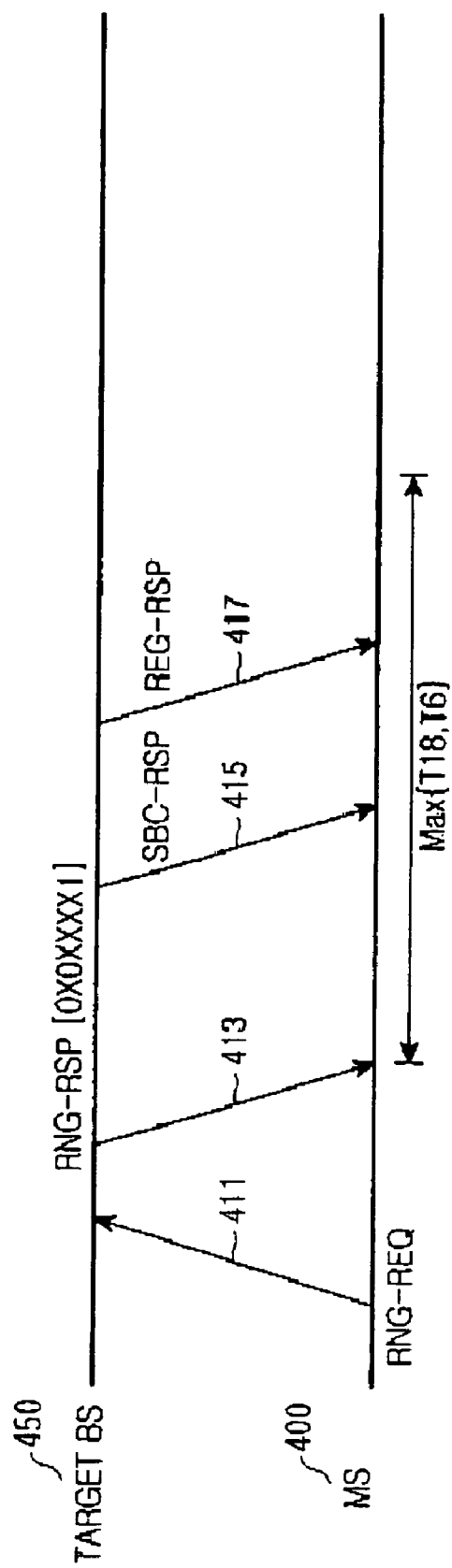
FIG. 4 is a signaling diagram illustrating operations of an MS and a target BS when the MS receives an RNG-RSP message with an HO Process Optimization field='0X0XXXX1' during a network re-entry operation in an IEEE 802.16e communication system according to an embodiment of the present invention.

FIG. 4 is a signaling diagram illustrating operations of an MS and a target BS when the MS receives an RNG-RSP message with an HO Process Optimization field='0X0XXXX1' during a network re-entry operation in an IEEE 802.16e communication system according to an embodiment of the present invention.

Referring to FIG. 4, after performing handover to a target BS 450, an MS 400 transmits in step 411 an RNG-REQ message to the target BS 450 to report the handover. Upon receiving the RNG-REQ message from the MS 400, the target BS 450 transmits in step 413 an RNG-RSP message with an HO Process Optimization field='0X0XXXX1' to the MS 400 in response to the RNG-REQ message. Upon receiving the RNG-RSP message from the target BS 450, the MS 400 checks the HO Process Optimization field in the RNG-RSP message and starts a Max{T18,T6} timer because the HO Process Optimization field is set to '0X0XXXX1'.

If the MS 400 normally receives an SBC-RSP message and an REG-RSP message transmitted by the target BS 450 in steps 415 and 417 before the Max{T18,T6} timer expires, the MS 400 stops the Max{T18,T6} timer and performs the next process for the network re-entry operation.

Figure 5:
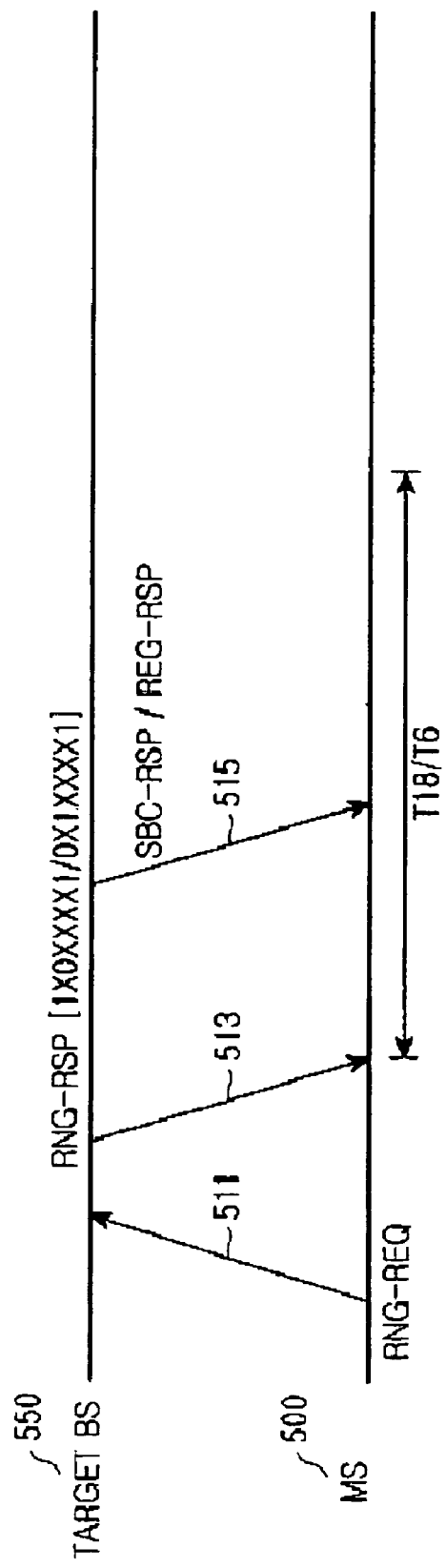
FIG. 5 is a signaling diagram illustrating operations of an MS and a target BS when the MS receives an RNG-RSP message with an HO Process Optimization field='1X0XXXX1/0X1XXXX1' during a network re-entry operation in an IEEE 802.16e communication system according to an embodiment of the present invention.

FIG. 5 is a signaling diagram illustrating operations of an MS and a target BS when the MS receives an RNG-RSP message with an HO Process Optimization field='1X0XXXX1/0X1XXXX1' during a network re-entry operation in an IEEE 802.16e communication system according to an embodiment of the present invention.

For convenience, it will be assumed that an expression 'A/B' represents 'A or B'. Therefore, the HO Process Optimization field='1X0XXXX1' or '0X1XXXX1' will be expressed as an HO Process Optimization field='1X0XXXX1/0X1XXXX1'.

Referring to FIG. 5, after performing handover to a target BS 550, an MS 500 transmits in step 511 an RNG-REQ message to the target BS 550 to report the handover. Upon receiving the RNG-REQ message from the MS 500, the target BS 550 transmits in step 513 an RNG-RSP message with an HO Process Optimization field='1X0XXXX1/0X1XXXX1' to the MS 500 in response to the RNG-REQ message. Upon receiving the RNG-RSP message from the target BS 550, the MS 500 checks the HO Process Optimization field in the RNG-RSP message and starts T18/6 timer because the HO Process Optimization field is set to '1X0XXXX1/0X1XXXX1'.

If the MS 500 normally receives an SBC-RSP/REG-RSP message transmitted by the target BS 550 in step 515 before the T18/T6 timer expires, the MS 500 stops the T18/T6 timer and performs the next process for the network re-entry operation.

Figure 6:
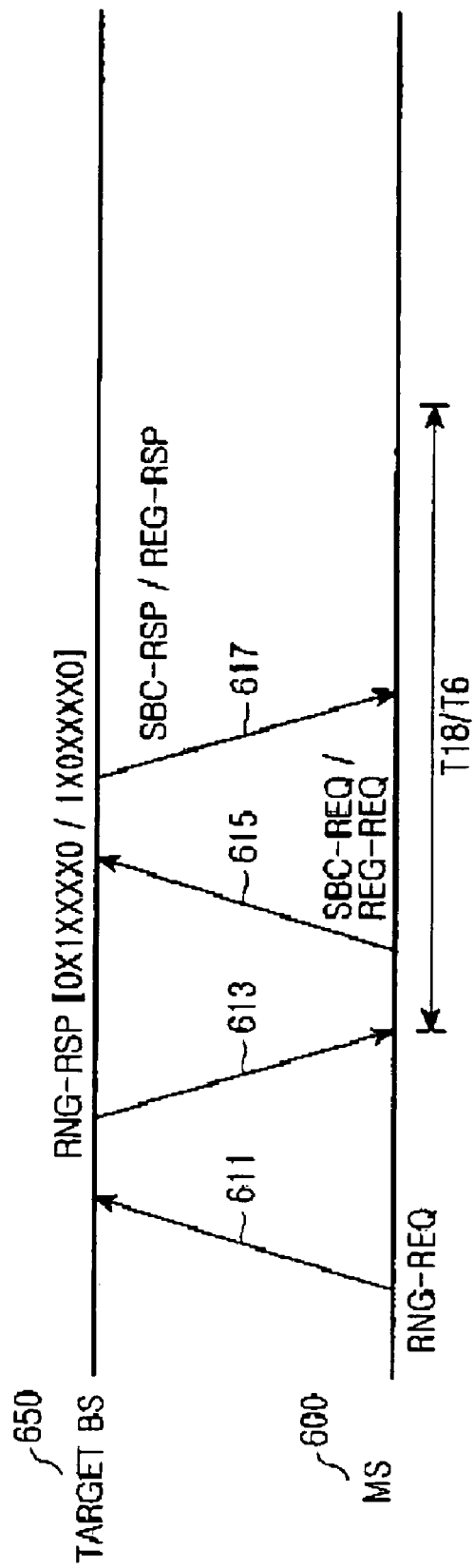
FIG. 6 is a signaling diagram illustrating operations of an MS and a target BS when the MS receives an RNG-RSP message with an HO Process Optimization field='0X1XXXX0/1X0XXXX0' during a network re-entry operation in an IEEE 802.16e communication system according to an embodiment of the present invention.

FIG. 6 is a signaling diagram illustrating operations of an MS and a target BS when the MS receives an RNG-RSP message with an HO Process Optimization field='0X1XXXX0/1X0XXXX0' during a network re-entry operation in an IEEE 802.16e communication system according to an embodiment of the present invention.

Referring to FIG. 6, after performing handover to a target BS 650, an MS 600 transmits in step 611 an RNG-REQ message to the target BS 650 to report the handover. Upon receiving the RNG-REQ message from the MS 600, the target BS 650 transmits in step 613 an RNG-RSP message with an HO Process Optimization field='0X1XXXX0/1X0XXXX0' to the MS 600 in response to the RNG-REQ message.

Upon receiving the RNG-RSP message from the target BS 650, the MS 600 checks the HO Process Optimization field in the RNG-RSP message and transmits in step 615 an SBC-REQ/REG-REQ message to the target BS 650 because the HO Process Optimization field is set to '0X1XXXX0/1X0XXXX0'. At the same time, the MS 600 starts the T18/T6 timer. If the MS 600 normally receives an SBC-RSP/REG-RSP message transmitted by the target BS 650 in step 617 before the T18/T6 timer expires, the MS 600 stops the T18/T6 timer and performs the next process for the network re-entry operation.

Figure 7:
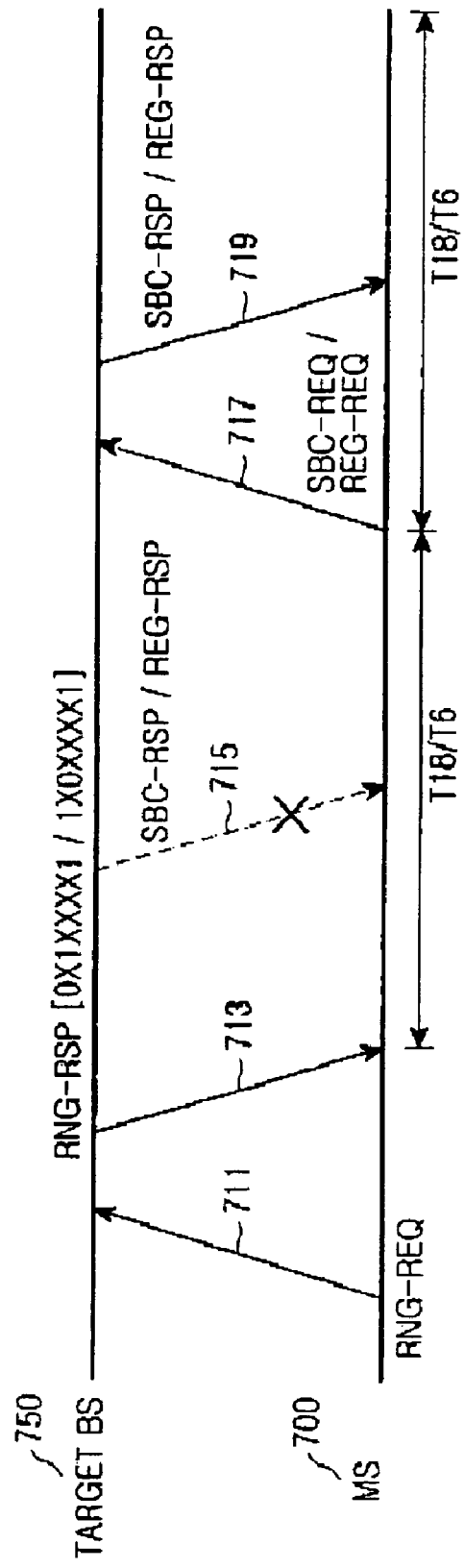
FIG. 7 is a signaling diagram illustrating operations of an MS and a target BS when the MS receives an RNG-RSP message with an HO Process Optimization field='0X1XXXX1/1X0XXXX1' during a network re-entry operation in an IEEE 802.16e communication system according to an embodiment of the present invention.

FIG. 7 is a signaling diagram illustrating operations of an MS and a target BS when the MS receives an RNG-RSP message with an HO Process Optimization field='0X1XXXX1/1X0XXXX1' during a network re-entry operation in an IEEE 802.16e communication system according to an embodiment of the present invention.

Referring to FIG. 7, after performing handover to a target BS 750, an MS 700 transmits in step 711 an RNG-REQ message to the target BS 750 to report the handover. Upon receiving the RNG-REQ message from the MS 700, the target BS 750 transmits in step 713 an RNG-RSP message with an HO Process Optimization field='0X1XXXX1/1X0XXXX1' to the MS 700 in response to the RNG-REQ message.

Upon receiving the RNG-RSP message from the target BS 750, the MS 700 checks the HO Process Optimization field in the RNG-RSP message and starts a T18/T6 timer because the HO Process Optimization field is set to '0X1XXXX1/1X0XXXX1'. However, the MS 700 fails to normally receive an SBC-RSP/REG-RSP message transmitted by the target BS 750 in step 715 due to a bad channel state. Alternatively, in some cases, the target BS 750 may fail to transmit the SBC-RSP/REG-RSP message before the T18/T6 timer expires due to its situation.

Because the MS 700 has failed to receive the SBC-RSP/REG-RSP message from the target BS 750 before the T18/T6 timer expires, it retransmits in step 717 the SBC-REQ/REG-REQ message to the target BS 750 to request retransmission of the SBC-RSP/REG-RSP message. Upon receiving the SBC-REQ/REG-REQ message from the MS 700, the target BS 750 retransmits in step 719 the SBC-RSP/REG-RSP message to the MS 700, recognizing that the MS 700 has failed to normally receive the SBC-RSP/REG-RSP message transmitted by the target BS 750.

The MS 700 restarts (resets) the T18/T6 timer at the time of transmitting the SBC-REQ/REG-REQ message, and if the MS 700 normally receives the SBC-RSP/REG-RSP message from the target BS 750 in step 719 before the T18/T6 timer expires, the MS 700 stops the T18/T6 timer and performs the next process for the network re-entry operation.

Figure 8:
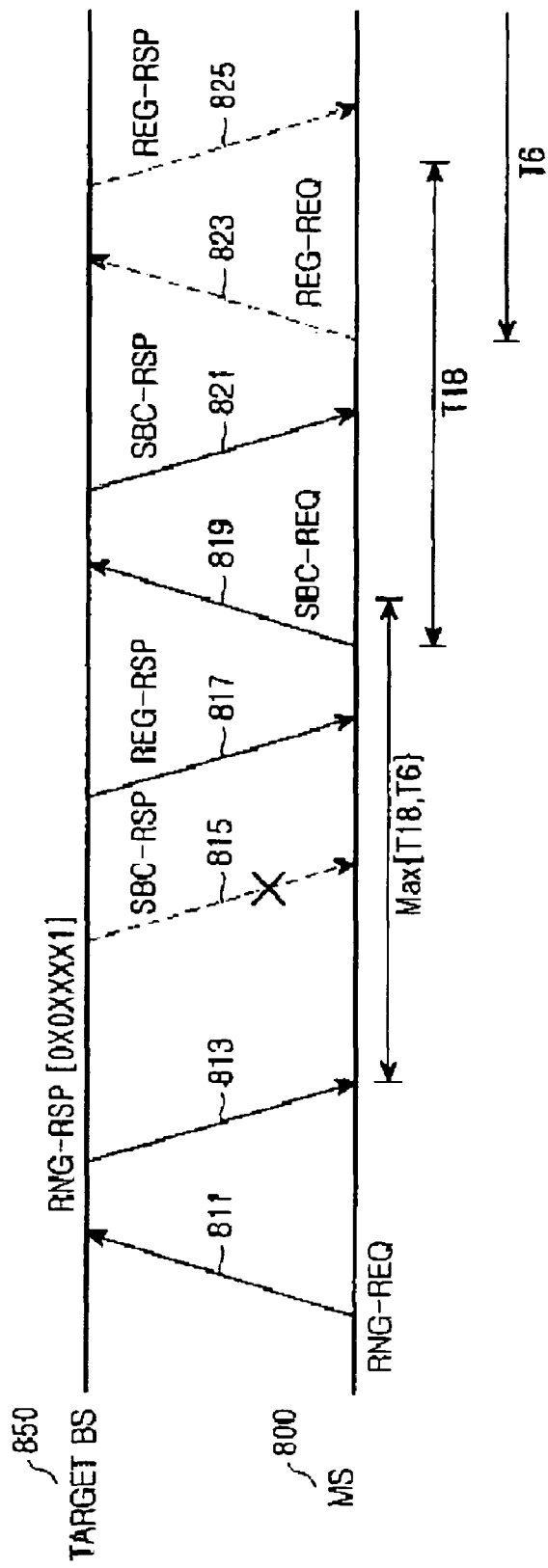
FIG. 8 is a signaling diagram illustrating operations of an MS and a target BS when the MS detects an error in an SBC-RSP message transmitted by the target BS after receiving an RNG-RSP message with an HO Process Optimization field='0X0XXXX1' during a network re-entry operation in an IEEE 802.16e communication system according to an embodiment of the present invention.

FIG. 8 is a signaling diagram illustrating operations of an MS and a target BS when the MS detects an error in an SBC-RSP message transmitted by the target BS after receiving an RNG-RSP message with an HO Process Optimization field='0X0XXXX1' during a network re-entry operation in an IEEE 802.16e communication system according to an embodiment of the present invention.

Referring to FIG. 8, after performing handover to a target BS 850, an MS 800 transmits in step 811 an RNG-REQ message to the target BS 850 to report the handover. Upon receiving the RNG-REQ message from the MS 800, the target BS 850 transmits in step 813 an RNG-RSP message with an HO Process Optimization field='0X0XXXX1' to the MS 800 in response to the RNG-REQ message.

Upon receiving the RNG-RSP message from the target BS 850, the MS 800 checks the HO Process Optimization field in the RNG-RSP message and starts a Max{T18,T6} timer because the HO Process Optimization field is set to '0X0XXXX1'. However, before the Max{T18,T6} timer expires, the MS 800 fails in step 815 to normally receive an SBC-RSP message transmitted by the target BS 850 due to a bad channel state, and in step 817 normally receives an REG-RSP message transmitted by the target BS 850. In this case, the MS 800 recognizes occurrence of an error as it receives the REG-RSP message without receiving the SBC-RSP message. As a result, the MS 800 stops the Max{T18,T6} timer and transmits in step 819 an SBC-REQ message to the target BS 850 to request retransmission of the SBC-RSP message.

The target BS 850, as it receives the SBC-REQ message from the MS 800, recognizes that the MS 800 has failed to normally receive the SBC-RSP message transmitted by the target BS 850. As a result, the target BS 850 retransmits in step 821 the SBC-RSP message to the MS 800. The MS 800 starts a T18 timer at the time of transmitting the SBC-REQ message, and if the MS 800 receives the SBC-RSP message retransmitted by the target BS 850 before the T18 timer expires, it stops the T18 timer and performs the next process for the network re-entry operation.

Upon normally receiving the SBC-RSP message, the MS 800 can either transmit in step 823 the REG-REQ message to the target BS 850 to request retransmission of the REG-RSP message in order to maintain the order of the network re-entry operation, or not transmit the REG-REQ message if it is possible to use the received REG-RSP message. Upon receiving the REG-REQ message from the MS 800, the target BS 850 retransmits in step 825 the REG-RSP message to the MS 800.

Figure 9:
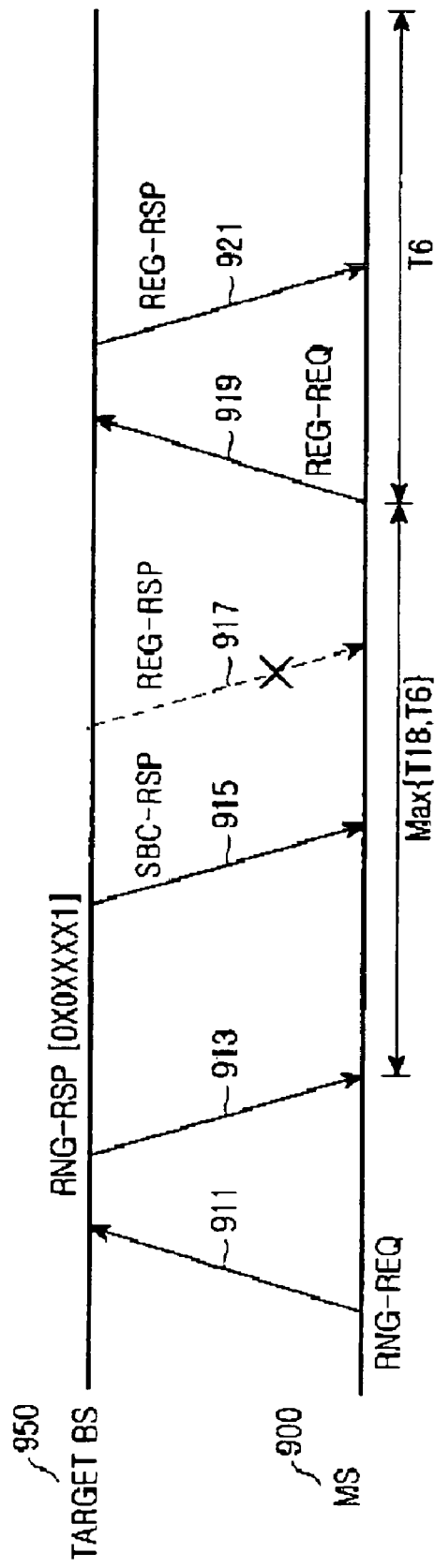
FIG. 9 is a signaling diagram illustrating operations of an MS and a target BS when the MS detects an error in an REG-RSP message transmitted by the target BS after receiving an RNG-RSP message with an HO Process Optimization field='0X0XXXX1' during a network re-entry operation in an IEEE 802.16e communication system according to an embodiment of the present invention.

FIG. 9 is a signaling diagram illustrating operations of an MS and a target BS when the MS detects an error in an REG-RSP message transmitted by the target BS after receiving an RNG-RSP message with an HO Process Optimization field='0X0XXXX1' during a network re-entry operation in an IEEE 802.16e communication system according to an embodiment of the present invention.

Referring to FIG. 9, after performing handover to a target BS 950, an MS 900 transmits in step 911 an RNG-REQ message to the target BS 950 to report the handover. Upon receiving the RNG-REQ message from the MS 900, the target BS 950 transmits in step 913 an RNG-RSP message with an HO Process Optimization field='0X0XXXX1' to the MS 900 in response to the RNG-REQ message.

Upon receiving the RNG-RSP message from the target BS 950, the MS 900 checks the HO Process Optimization field in the RNG-RSP message and starts a Max {T18,T6} timer because the HO Process Optimization field is set to '0X0XXXX1'. However, before the Max {T18,T6} timer expires, the MS 900 normally receives an SBC-RSP message transmitted by the target BS 950 in step 915, and fails to normally receive an REG-RSP message transmitted in step 917 by the target BS 950 due to a bad channel state. In this case, the MS 900 recognizes the occurrence of an error as it failed to receive the REG-RSP message before the Max {T18, T6} timer expires. As a result, the MS 900 transmits in step 919 an REG-REQ message to the target BS 950 to request retransmission of the REG-RSP message.

Upon receiving the REG-REQ message from the MS 900, the target BS 950 retransmits in step 921 the REG-RSP message to the MS 900, recognizing that the MS 900 has failed to normally receive the REG-RSP message transmitted by the target BS 950. The MS 900 starts a T6 timer at the time of transmitting the REG-REQ message, and if the MS 900 receives the REG-RSP message retransmitted by the target BS 950 before the T6 timer expires, the MS 900 stops the T6 timer and performs the next process for the network re-entry operation.

Figure 10:
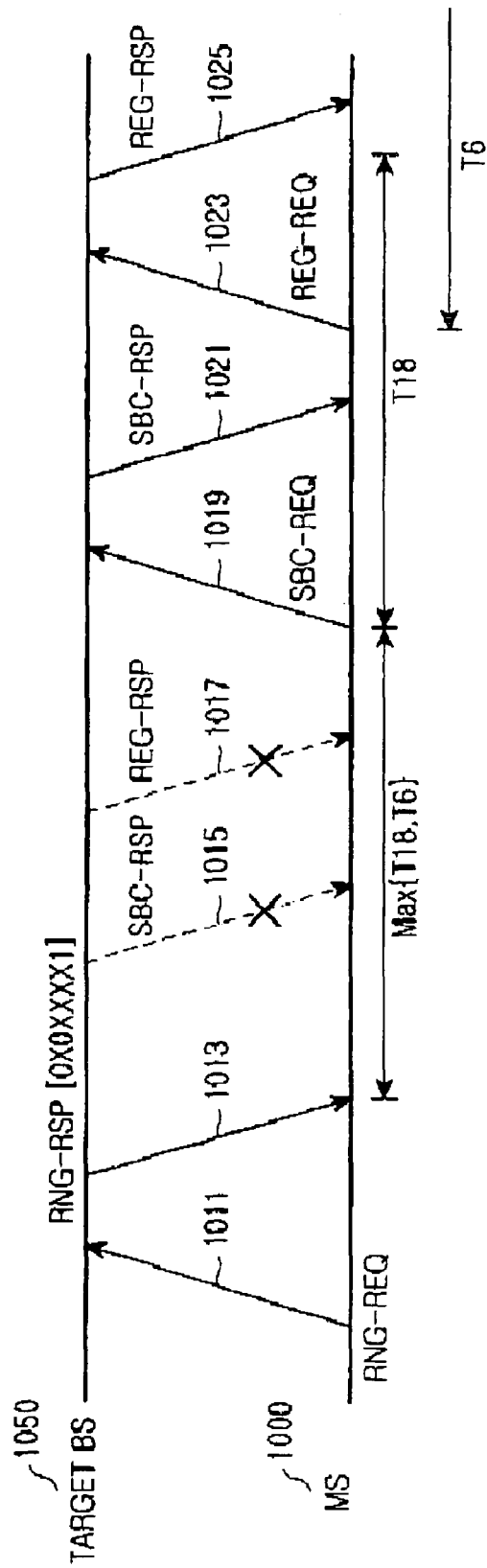
FIG. 10 is a signaling diagram illustrating operations of an MS and a target BS when the MS detects errors in both an SBC-RSP message and an REG-RSP message transmitted by the target BS after receiving an RNG-RSP message with an HO Process Optimization field='0X0XXXX1' during a network re-entry operation in an IEEE 802.16e communication system according to an embodiment of the present invention.

FIG. 10 is a signaling diagram illustrating operations of an MS and a target BS when the MS detects errors in both an SBC-RSP message and an REG-RSP message transmitted by the target BS after receiving an RNG-RSP message with an HO Process Optimization field='0X0XXXX1' during a network re-entry operation in an IEEE 802.16e communication system according to an embodiment of the present invention.

Referring to FIG. 10, after performing handover to a target BS 1050, an MS 1000 transmits in step 1011 an RNG-REQ message to the target BS 1050 to report the handover. Upon receiving the RNG-REQ message from the MS 1000, the target BS 1050 transmits in step 1013 an RNG-RSP message with an HO Process Optimization field='0X0XXXX1' to the MS 1000 in response to the RNG-REQ message.

Upon receiving the RNG-RSP message from the target BS 1050, the MS 1000 checks the HO Process Optimization field in the RNG-RSP message and starts a Max {T18,T6} timer because the HO Process Optimization field is set to '0X0XXXX1'. However, before the Max {T18, T6} timer expires, the MS 1000 fails to normally receive both of an SBC-RSP and an REG-RSP message transmitted in steps 1015 and 1017 by the target BS 1050 due to a bad channel state. In this case, the MS 1000 recognizes occurrence of an error as it failed to receive both the SBG-RSP message and the REG-RSP message before the Max{T18,T6} timer expires. As a result, the MS 1000 transmits in step 1019 an SBC-REQ message to the target BS 1050 to request retransmission of the SBC-RSP message. Upon receipt of the SBC-REQ message from the MS 1000, the target BS 1050 retransmits in step 1021 the SBC-RSP message to the MS 1000, recognizing that the MS 1000 has failed to normally receive the SBC-RSP message transmitted by the target BS 1050.

The MS 1000 starts a T18 timer at the time of transmitting the SBC-REQ message, and if the MS 1000 receives the SBC-RSP message retransmitted in step 1021 by the target BS 1050 before the T18 timer expires, the MS 1000 stops the T18 timer and transmits in step 1023 a REG-REQ message to the target BS 1050 to request retransmission of the REG-RSP message.

Upon receipt of the REG-REQ message from the MS 1000, the target BS 1050 retransmits in step 1025 the REG-RSP message to the MS 1000, recognizing that the MS 1000 has failed to normally receive the REG-RSP message transmitted by the target BS 1050. The MS 1000 starts a T6 timer at the time of transmitting the REG-REQ message, and if the MS 1000 receives the REG-RSP message retransmitted by the target BS 1050 before the T6 timer expires, it stops the T6 timer and performs the next process for the network re-entry operation.

As can be understood from the foregoing description, the use of a new HO Process Optimization field proposed in the present invention minimizes a network re-entry process and also minimizes a service time delay, contributing to improvement in Quality-of-Service (QoS). That is, the use of the new HO Process Optimization field can prevent a possible indefinite operation between an MS and a target BS, occurring when the target BS transmits one or both of an SBC-RSP message and an REG-RSP message to the MS if needed, regardless of set values of bit#0 and bit#2 of the HO Process Optimization field information. In addition, when the MS fails to normally receive an SBC-RSP message and an REG-RSP message transmitted by the target BS, the present invention allows the MS to send a retransmission request to the target BS as it failed to normally receive the SBC-RSP message and the REG-RSP message, thereby clearly specifying operations of the target BS and the MS in a network re-entry operation and minimizing a service delay time.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for performing a network re-entry operation by a target base station (BS), the method comprising the steps of:

detecting that a mobile station (MS) is to perform a handover to the target BS; and transmitting to the MS handover process optimization information, included in a ranging response (RNG-RSP) message, indicating a possibility of omitting at least one of a process of transmitting a registration response (REG-RSP) message from the target BS to the MS, and a process of transmitting a subscriber station basic capability response (SBC-RSP) message from the target BS to the MS, required by the MS to perform a network re-entry operation with the target BS due to the handover of the MS, wherein if the at least one omitted process is the process of transmitting the REG-RSP message, the handover process optimization information includes information indicating that the target BS omits the process of transmitting the REG-RSP message to the MS, and wherein if the at least one omitted process is the process of transmitting the SBC-RSP message, the handover process optimization information includes information indicating that the target BS omits the process of transmitting the SBC-RSP message to the MS.

2. The method of claim 1, further comprising:

after transmitting the handover process optimization information to the MS, performing a network re-entry operation with the MS according to the handover process optimization information.

3. A method for performing a network re-entry operation by a mobile station (MS), the method comprising the steps of:

transmitting to a target base station (BS) a notification indicating that the MS is to perform a handover from a serving BS to the target BS; and receiving handover process optimization information, included in a ranging response (RNG-RSP) message, indicating a possibility of omitting at least one of a process of transmitting a registration response (REG-RSP) message from the target BS to the MS, and a process of transmitting a subscriber station basic capability response (SBC-RSP) message from the target BS to the MS, required by the MS to perform a network re-entry operation with the target BS, from the target BS according to the handover notification, wherein if the at least one omitted process is the process of transmitting the REG-RSP message, the handover process optimization information includes information indicating that the target BS omits the process of transmitting the REG-RSP message to the MS, and wherein if the at least one omitted process is the process of transmitting the SBC-RSP message, the handover process optimization information includes information indicating that the target BS omits the process of transmitting the SBC-RSP message to the MS.

4. The method of claim 3, further comprising:

after receiving the handover process optimization information, performing a network re-entry operation with the target BS according to the handover process optimization information.

5. A system for performing a network re-entry operation in a communication system, the system comprising:

a target base station (BS) for detecting that a mobile station (MS) is to perform a handover to the target BS, and transmitting to the MS handover process optimization information, included in a ranging response (RNG-RSP) message, indicating a possibility of omitting at least one of a process of transmitting a registration response (REG-RSP) message from the target BS to the MS, and a process of transmitting a subscriber station basic capability response (SBC-RSP) message from the target BS to the MS, required by the MS to perform a network re-entry operation with the target BS due to the handover of the MS, wherein if the at least one omitted process is the process of transmitting the REG-RSP message, the handover process optimization information includes information indicating that the target BS omits the process of transmitting the REG-RSP message to the MS, and wherein if the at least one omitted process is the process of transmitting the SBC-RSP message, the handover process optimization information includes information indicating that the target BS omits the process of transmitting the SBC-RSP message to the MS.

6. The system of claim 5, wherein after transmitting the handover process optimization information to the MS, the target BS performs a network re-entry operation with the MS according to the handover process optimization information.

7. A system for performing a network re-entry operation in a communication system, the system comprising:

a mobile station (MS) for transmitting to a target base station (BS) a notification indicating that the MS is to perform a handover from a serving BS to the target BS, and receiving handover process optimization information, included in a ranging response (RNG-RSP) message, indicating a possibility of omitting at least one of a process of transmitting a registration response (REG-RSP) message from the target BS to the MS, and a process of transmitting a subscriber station basic capability response (SBC-RSP) message from the target BS to the MS, required by the MS to perform a network re-entry operation with the target BS, from the target BS according to the handover notification, wherein if the at least one omitted process is the process of transmitting the REG-RSP message, the handover process optimization information includes information indicating that the target BS omits the process of transmitting the REG-RSP message to the MS, and wherein if the at least one omitted process is the process of transmitting the SBC-RSP message, the handover process optimization information includes information indicating that the target BS omits the process of transmitting the SBC-RSP message to the MS.

8. The system of claim 7, wherein the MS performs a network re-entry operation with the target BS according to the handover process optimization information after receiving the handover process optimization information.

9. A system for performing a network re-entry operation in a communication system, the system comprising:

a mobile station (MS) for receiving handover process optimization information, included in a ranging response (RNG-RSP) message, indicating a possibility of omitting at least one of a process of transmitting a registration response (REG-RSP) message from a target base station (BS) to the MS, and a process of transmitting a subscriber station basic capability response (SBC-RSP) message from the target BS to the MS, required by the MS to perform a network re-entry operation with the target BS, from the target BS according to a handover notification, starting a timer to wait for receipt of the REG-RSP message until the timer expires if the at least one omitted process is the process of transmitting the REG-RSP message, and the handover process optimization information includes information indicating that the target BS omits the process of transmitting the REG-RSP message to the MS, and starting the timer to wait for receipt of the SBC-RSP message until the timer expires if the at least one omitted process is the process of transmitting the SBC-RSP message, and the handover process optimization information includes information indicating that the target BS omits the process of transmitting the SBC-RSP message to the MS.

10. A method for performing a network re-entry operation by a mobile station (MS), the method comprising the steps of:

receiving handover process optimization information, included in a ranging response (RNG-RSP) message, indicating a possibility of omitting at least one of a process of transmitting a registration response (REG-RSP) message from a target base station (BS) to the MS, and a process of transmitting a subscriber station basic capability response (SBC-RSP) message from the target BS to the MS, required by the MS to perform a network re-entry operation with the target BS, from the target BS according to handover notification;

starting a timer to wait for receipt of the REG-RSP message until the timer expires if the at least one omitted process is the process of transmitting the REG-RSP message, and the handover process optimization information includes information indicating that the target BS omits the process of transmitting the REG-RSP message to the MS; and starting the timer to wait for receipt of the SBC-RSP message until the timer expires if the at least one omitted process is the process of transmitting the SBC-RSP message, and the handover process optimization information includes information indicating that the target BS omits the process of transmitting the SBC-RSP message to the MS.

* * * * *